United States Patent
Onoue et al.

(10) Patent No.: US 11,271,457 B2
(45) Date of Patent: Mar. 8, 2022

(54) ROTATING ELECTRICAL MACHINE

(71) Applicant: Mitsubishi Electric Corporation, Tokyo (JP)

(72) Inventors: Takanori Onoue, Tokyo (JP); Hiroyuki Takashima, Tokyo (JP); Hironori Tsuiki, Tokyo (JP); Takuya Uryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 106 days.

(21) Appl. No.: 16/830,552

(22) Filed: Mar. 26, 2020

(65) Prior Publication Data
US 2021/0143692 A1 May 13, 2021

(30) Foreign Application Priority Data

Nov. 12, 2019 (JP) .............................. JP2019-204485

(51) Int. Cl.
*H02K 11/21* (2016.01)
*H02K 5/00* (2006.01)
(Continued)

(52) U.S. Cl.
CPC ............. *H02K 11/21* (2016.01); *H02K 1/146* (2013.01); *H02K 1/185* (2013.01); *H02K 5/00* (2013.01); *H02K 5/04* (2013.01); *H02K 5/06* (2013.01)

(58) Field of Classification Search
CPC ...... H02K 11/21; H02K 11/20; H02K 11/215; H02K 11/22; H02K 11/225; H02K 11/24;
(Continued)

(56) References Cited

U.S. PATENT DOCUMENTS

2002/0175574 A1\* 11/2002 Okazaki ................. H02K 5/225
310/68 B
2013/0026888 A1\* 1/2013 Migita ................. H02K 11/215
310/68 B
(Continued)

FOREIGN PATENT DOCUMENTS

JP 2010263691 A 11/2010
JP 2016015812 A 1/2016
(Continued)

OTHER PUBLICATIONS

Communication from the Japanese Patent Office dated Dec. 1, 2020 in Patent Application No. 2019-204485.

*Primary Examiner* — Quyen P Leung
*Assistant Examiner* — Alexander A Singh
(74) *Attorney, Agent, or Firm* — Sughrue Mion, PLLC; Richard C. Turner

(57) ABSTRACT

The rotating electrical machine includes a rotor held so as to be able to rotate, and a stator that opposes the rotor and has a stator iron core in which a multiple of slots are formed. The stator includes a coil wound around a toothed portion that forms the multiple of slots and an annular frame that holds an outer periphery of the stator iron core, a trunk portion and a flange portion are formed in the frame, a notch portion is provided in the trunk portion and the flange portion, the stator iron core is held by the trunk portion, and a reinforcing member that straddles the notch portion is provided on the flange portion.

12 Claims, 4 Drawing Sheets

(51) Int. Cl.
   *H02K 5/04*         (2006.01)
   *H02K 1/18*         (2006.01)
   *H02K 1/14*         (2006.01)
   *H02K 5/06*         (2006.01)

(58) Field of Classification Search
   CPC ........ H02K 11/25; H02K 1/185; H02K 1/146;
                  H02K 1/18; H02K 5/04; H02K 15/02;
                  H02K 5/00; H02K 5/06; H02K 5/08
   USPC .......................................... 310/89, 68 B, 71
   See application file for complete search history.

(56) References Cited

U.S. PATENT DOCUMENTS

| | | | |
|---|---|---|---|
| 2014/0132096 A1* | 5/2014 | Takeda ................. | H02K 15/026 310/71 |
| 2014/0197705 A1* | 7/2014 | Sato ......................... | H02K 5/04 310/91 |
| 2015/0162798 A1* | 6/2015 | Ozawa ................... | H02K 5/161 310/43 |
| 2019/0305614 A1* | 10/2019 | Ikura ....................... | H02K 1/185 |
| 2020/0287428 A1* | 9/2020 | Ishizaki ................. | H02K 11/33 |

FOREIGN PATENT DOCUMENTS

| | | | | |
|---|---|---|---|---|
| JP | 2016-032355 A | | 3/2016 | |
| WO | WO-2019155541 A1 | * | 8/2019 | ............. H02K 11/33 |

* cited by examiner

ROTATING ELECTRICAL MACHINE

BACKGROUND OF THE INVENTION

The present application relates to a rotating electrical machine.

DESCRIPTION OF THE RELATED ART

A rotating electrical machine wherein a frame on which a flange portion is provided is press-fitted onto a stator iron core, and the flange portion is joined to a vehicle-side housing by fastening with a screw member, is commonly used in a hybrid vehicle, as disclosed in, for example, Patent Literature 1.

Patent Literature 1: JP-A-2016-32355

The kind of rotating electrical machine disclosed in Patent Literature 1 is such that when the frame is press-fitted onto the stator iron core, a press-fitting load increases, and there is a problem in that deformation occurs in the stator iron core, and roundness of the stator iron core worsens. Therefore, a conceivable structure is such that deformation of the stator iron core is restricted by a notch being formed in the frame, thereby reducing rigidity of the frame. However, there is a problem in that the rigidity of the frame decreases due to the notch being formed.

SUMMARY OF THE INVENTION

The present application discloses technology for resolving the aforementioned kind of problem, and has an object of providing a rotating electrical machine such that rigidity of a frame is lowered, and deformation of a stator iron core can be restricted when the stator iron core is held by the frame.

A rotating electrical machine disclosed in the present application is characterized by including a rotor held so as to be able to rotate, and a stator that opposes the rotor and has a stator iron core in which a multiple of slots are formed, wherein the stator includes a coil wound around a toothed portion that forms the multiple of slots and an annular frame that holds an outer periphery of the stator iron core, a trunk portion and a flange portion are formed in the frame, a notch portion is provided in the trunk portion and the flange portion, the stator iron core is held by the trunk portion, and a reinforcing member that straddles the notch portion is provided on the flange portion.

According to the rotating electrical machine disclosed in the present application, a rotating electrical machine such that rigidity of a frame is lowered, and deformation of a stator iron core can be restricted when the stator iron core is held by the frame, can be provided.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
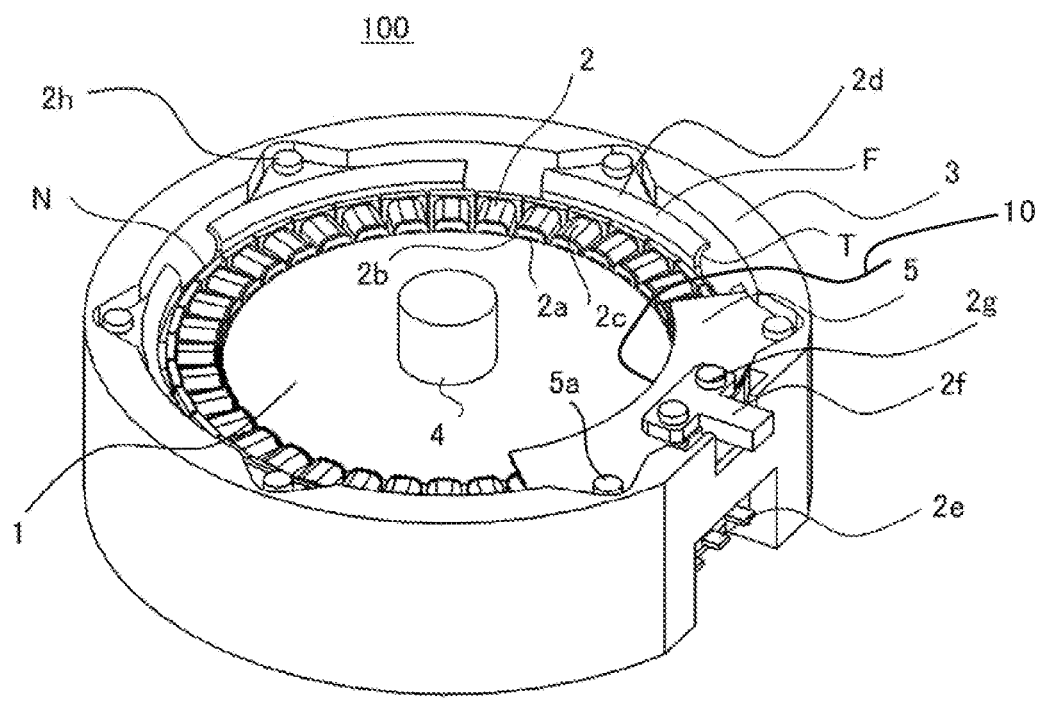
FIG. 1 is a perspective view of a rotating electrical machine according to a first embodiment.

Hereafter, using the drawings, preferred embodiments of a rotating electrical machine according to the present application will be described. In the drawings, identical reference signs are allotted to identical or similar constituent portions, while sizes or scales of corresponding constituent members are independent.

First Embodiment

Figure 2:
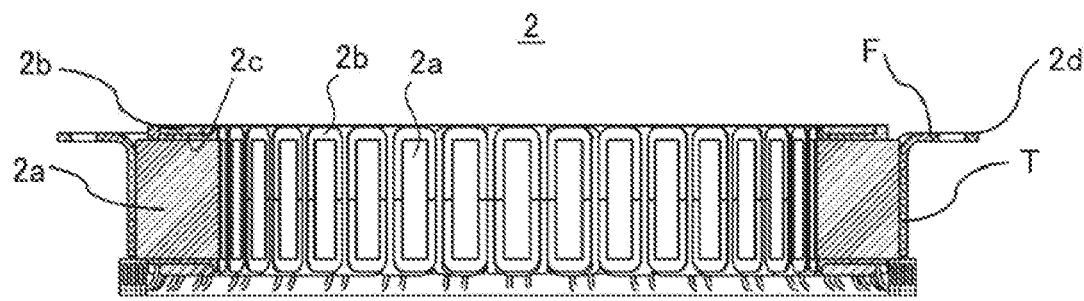
FIG. 2 is a sectional view showing a stator of the rotating electrical machine according to the first embodiment.

FIG. 1 is a perspective view of a rotating electrical machine according to a first embodiment, and FIG. 2 is a sectional view showing a stator of the rotating electrical machine according to the first embodiment.

In FIGS. 1 and 2, a rotating electrical machine 100 includes a rotor 1, held so as to be able to rotate, and a stator 2, which is configured by thin electromagnetic steel plates being stacked and in which are formed multiple slots opposing the rotor 1, wherein the stator 2 is assembled in a cylindrical case 3. The stator 2 includes a stator iron core 2a, a coil 2b wound around a toothed portion of the stator iron core 2a across an insulating material, an insulating film 2c that covers the coil 2b, an annular frame 2d, a power supply unit 2e, a rotation sensor 2f, which is a rotational position detector that detects a rotational position of the rotor 1, a sensor attaching screw 2g that attaches the rotation sensor 2f to the case 3, a frame attaching screw 2h that attaches a flange portion F formed on the frame 2d to the case 3, a signal line 10 that extracts a detection signal from the rotation sensor 2f, a wiring member leading to the power supply unit 2e, and the like. Reference sign 4 indicates a rotor shaft. The flange portion F of the frame 2d and the case 3 may be fixed by welding or the like instead of by the frame attaching screw 2h.

As heretofore described, the flange portion F formed on the frame 2d is fixed to the case 3 by the frame attaching screw 2h, or by welding or the like. In particular, a flat rotating electrical machine assembled sandwiched between an engine and a transmission of a vehicle is such that a space at either axial direction end of the case 3 is narrow, and a notch portion N is provided in an outer periphery of a trunk portion T of the frame 2d in order to secure a space in which to dispose the signal line that extracts a detection signal from the rotation sensor 2f.

The stator iron core 2a wherein thin electromagnetic steel plates are stacked is assembled by caulking or welding so that the electromagnetic steel plates are not dispersed. Also, the stator iron core 2a is an integrated or split iron core configured in an annular form. The stator iron core 2a has a toothed portion forming a multiple of slots, an insulating material is mounted on a side face of the toothed portion, the coil 2b covered by the insulating film 2c is wound around the toothed portion of the stator iron core 2a across the insulating material, and a terminal line for connecting to a wire connecting member is drawn out from the coil 2b. The power supply unit 2e is provided in the wire connecting member, and connected to, for example, an inverter.

An outer periphery of the stator iron core 2a is held by the annular frame 2d using press-fitting, shrink-fitting, or welding or the like. The notch portion N is provided in the outer periphery of the trunk portion T in the frame 2d, whereby rigidity is lowered, and the configuration more easily follows that of the stator iron core 2a. Herein, a structure that easily follows the stator iron core 2a can be adopted by fabricating the frame 2d from a thin plate of a thickness in the region of 1 to 9 mm, whereby rigidity is lowered in the same way as with the notch portion N without providing the notch portion N, but there is concern that the rigidity of the frame 2d will decrease. Also, the rotation sensor 2f, or a sensor such as a temperature sensor, is attached to the stator 2, and the notch portion N is needed in order to secure a space in which to dispose a signal line that extracts a sensor detection signal to an exterior.

The flange portion F and the trunk portion T are formed on the frame 2d, and the frame 2d is fastened by the frame attaching screw 2h to the case 3 via a hole provided in the flange portion F. A multiple of the notch portion N are provided at an even pitch, or a pitch considered to be an even pitch, that is, an approximately even pitch, in the outer periphery of the trunk portion T of the frame 2d. The frame 2d is fabricated by pressing, and the trunk portion T is formed after a hole corresponding to the notch portion N is punched out in a flat plate state, or the notch portion N is formed by punching out or cutting after the trunk portion T is formed.

The trunk portion T becomes deformed, with the notch portion N as an origin, due to residual stress when the trunk portion T is formed. For example, when the notch portion N is formed in one place, or a multiple of the notch portion N are formed at an uneven pitch, in order to dispose the signal line, rigidity between cutouts N becomes uneven, and amounts of deformation become uneven, which leads to a worsening of roundness of the frame 2d. Because of this, deformation of the frame 2d is reduced in this embodiment by disposing a multiple of the notch portion N at an approximately even pitch, or desirably at an even pitch, so that rigidity between notch portions N is even.

Figure 3:
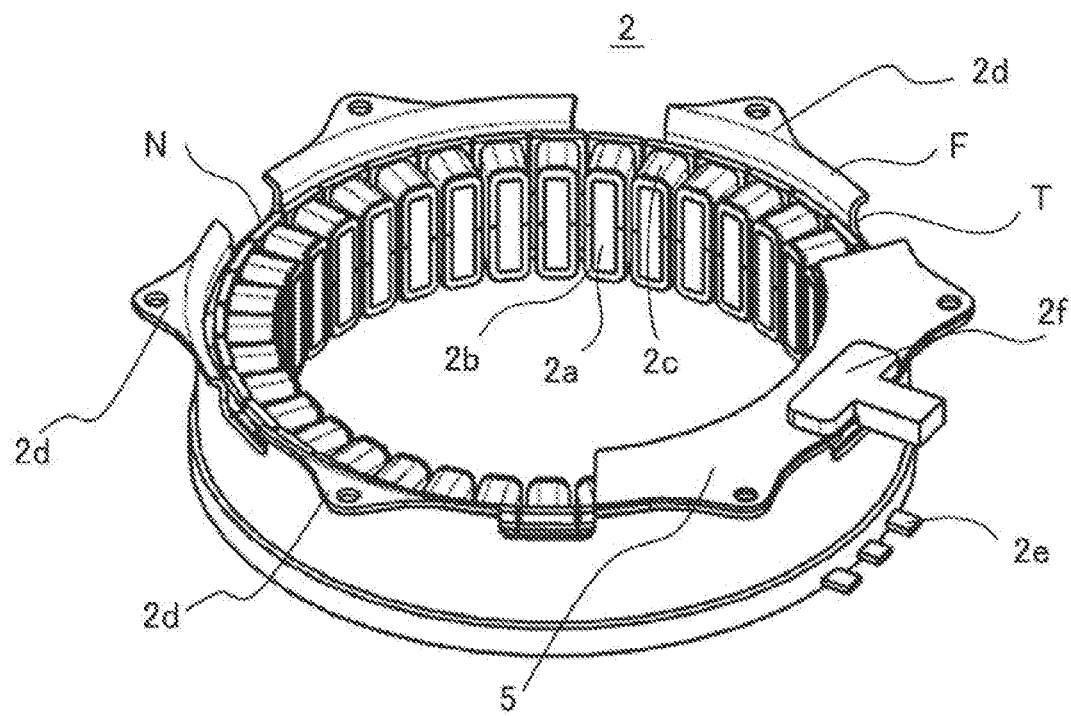
FIG. 3 is a perspective view showing the stator of the rotating electrical machine according to the first embodiment.

By one or a multiple of flange portions F being provided between notch portions N, and the frame 2d being fastened to the case 3 by the frame attaching screw 2h, a structure that is unlikely to shake when vibrating is obtained, but the rigidity of the frame 2d is low, and there is concern that the frame 2d will be damaged when an excessive vibration is input. Because of this, in this embodiment, the frame 2d is fastened with a reinforcing member 5 attached by a screw member 5a to the frame 2d straddling the notch portion N of the flange portion F, as shown in FIGS. 1 and 3, whereby an increase in the rigidity of the frame 2d is achieved. Although the reinforcing member 5 is provided in one place in FIGS. 1 and 3, the reinforcing member 5 may be provided in all places straddling the notch portion N.

Also, when the rotation sensor 2f is installed in the flange portion F, vibration of the rotation sensor 2f can also be restricted by providing the reinforcing member 5, and accuracy of detecting the position of the rotor 1 improves.

In this embodiment, the rotation sensor 2f is included in the reinforcing member 5 provided on the flange portion F, and by adopting this kind of configuration, the signal line of the rotation sensor 2f can be disposed in the notch portion N of the frame 2d, because of which space can be effectively utilized.

Figure 4:
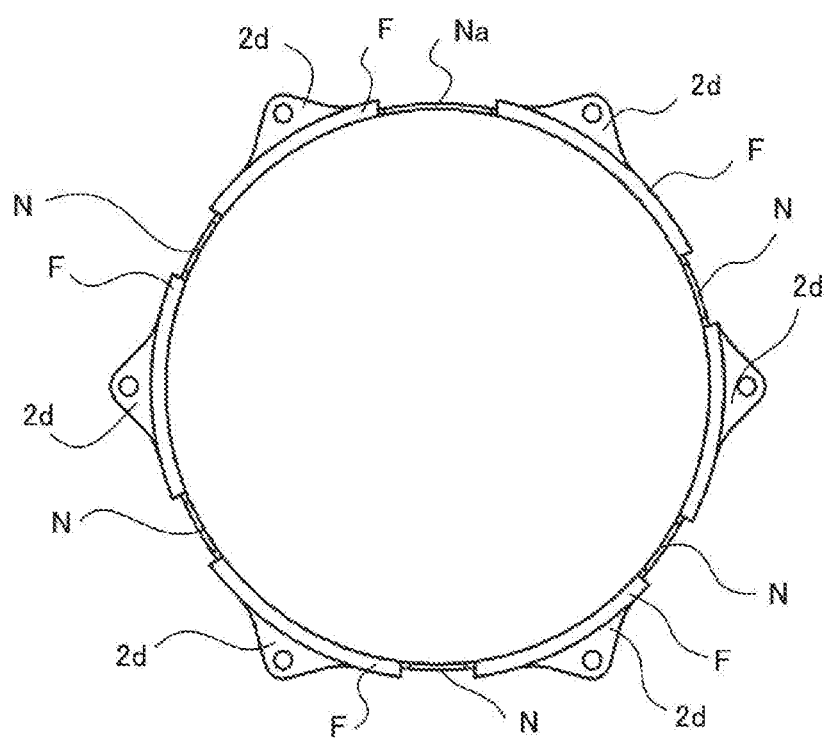
FIG. 4 is a plan view showing another example of a frame of the rotating electrical machine according to the first embodiment.

Also, in the examples shown in FIGS. 1 and 3, the reinforcing member 5 is provided in one place on the flange portion F, but when a notch portion Na larger than the other notch portions N exists in one portion, as shown by the notch portion Na of FIG. 4, and there is a place in which the rigidity of the frame 2d is lower than in other places, the rigidity can be effectively reinforced by providing the reinforcing member 5 in the relevant place.

In addition, by an annular form or an arc form being adopted for the reinforcing member 5, annular rigidity of the reinforcing member 5 is increased, a further increase in the rigidity of the frame 2d can be achieved, and, as an inner peripheral portion is also circular, interference with the rotor 1 easily avoided.

As heretofore described, the rotating electrical machine 100 according to the first embodiment includes the rotor 1, held so as to be able to rotate, and the stator 2, which opposes the rotor 1 and has the stator iron core 2a in which a multiple of slots are formed, wherein the stator 2 includes the coil 2b, wound around the toothed portion that forms the multiple of slots, and the annular frame 2d, which holds the outer periphery of the stator iron core 2a, the trunk portion T and the flange portion F are formed in the frame 2d, the notch portion N is provided in the trunk portion T and the flange portion F, the stator iron core 2a is held by the trunk portion T, and the reinforcing member 5 is provided on the flange portion F straddling the notch portion N.

Consequently, according to the rotating electrical machine 100 according to the first embodiment, the rigidity of the frame 2d is lowered, and deformation of the stator iron core 2a can be restricted when the stator iron core 2a is held by the frame 2d.

Second Embodiment

Figure 5:
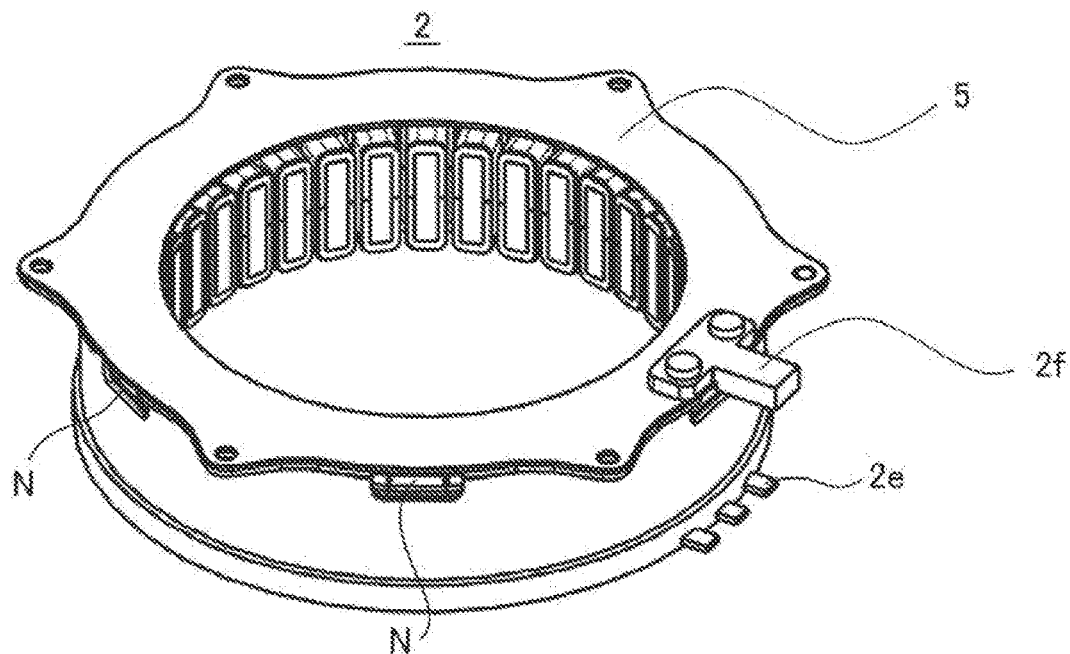
FIG. 5 is a perspective view showing a stator of a rotating electrical machine according to a second embodiment.

Next, a rotating electrical machine according to second embodiment will be described. FIG. 5 is a perspective view of the rotating electrical machine according to the second embodiment.

The rotating electrical machine according to the second embodiment is such that the reinforcing member 5 is formed in an annular form, and provided over a whole periphery of the flange portion F formed in the frame 2d, as shown in FIG. 5. By adopting this kind of configuration, the rigidity of the whole of the frame 2d can be increased. As other configurations are the same as in the first embodiment, an illustrated description thereof will be omitted.

Figure 6:
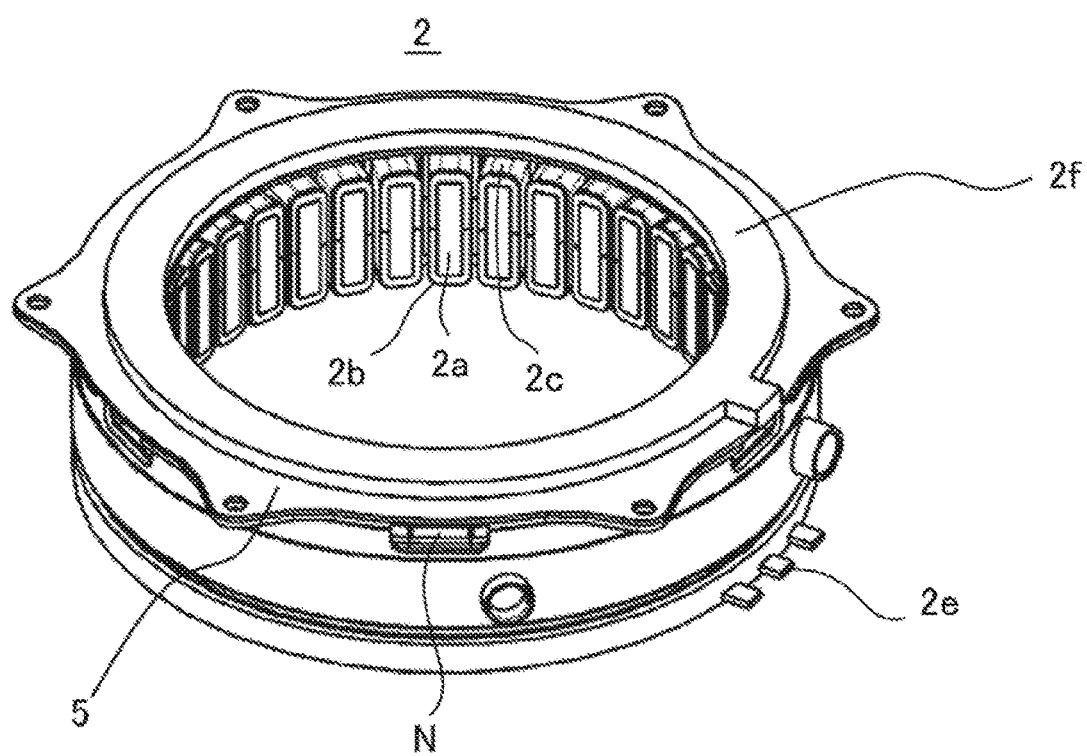
FIG. 6 is a perspective view showing another example of a stator of the rotating electrical machine according to the second embodiment.
Figure 7:
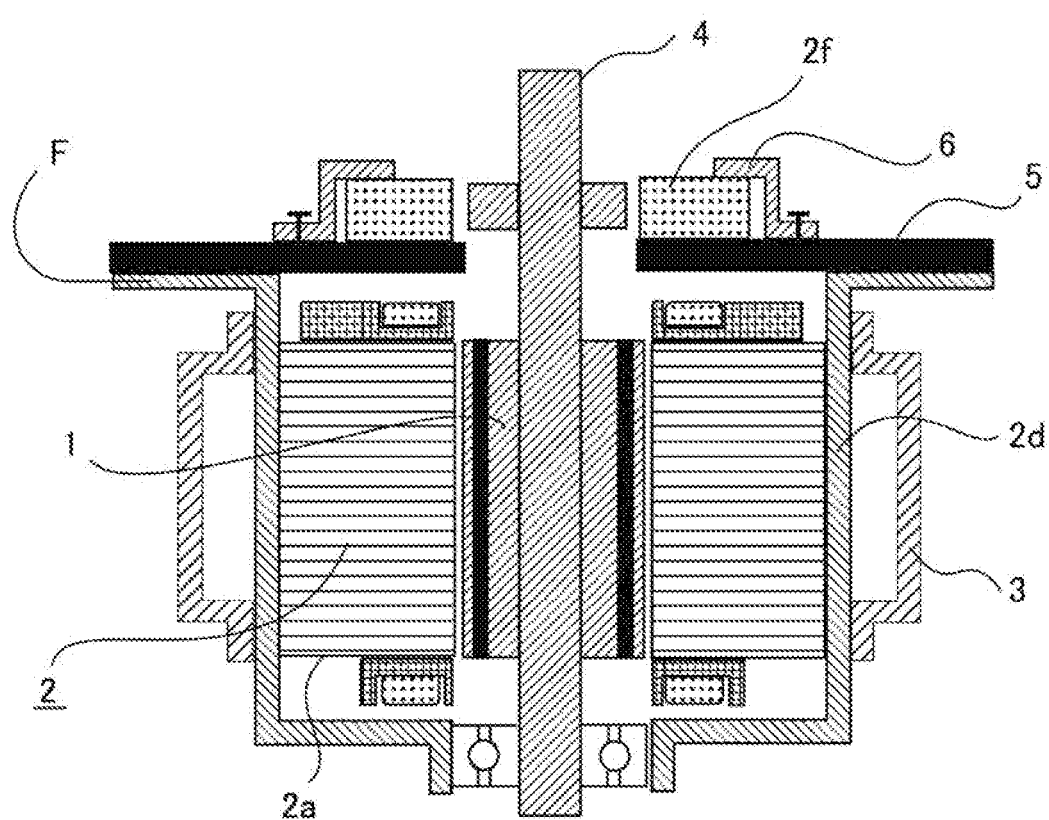
FIG. 7 is a sectional view showing still another example of a stator of the rotating electrical machine according to the second embodiment.

Herein, the rotation sensor 2f may be directly attached to the reinforcing member 5 using the sensor attaching screw 2g shown in FIG. 1, as shown in FIG. 6, or may be indirectly attached to the reinforcing member 5 in such a way as to be clamped using a holding member 6, as shown in FIG. 7.

By the rotation sensor 2f being directly attached to the reinforcing member 5 using the sensor attaching screw 2g in this way, manufacturing costs of the rotating electrical machine can be restricted, and freedom of design, such as attachment place adjustment, can be increased. In addition, detection accuracy of the rotation sensor 2f increases owing to distortion of the reinforcing member 5 being absorbed when fixing. Also, by the rotation sensor 2f being indirectly attached to the reinforcing member 5 in such a way as to be clamped using the holding member 6, freedom of design can be increased.

Also, a reduction in weight of the rotating electrical machine can be achieved by the rotation sensor 2*f* being attached to one portion of the reinforcing member 5 formed in an annular form, as shown in FIG. 5. Also, the manufacturing costs of the rotating electrical machine can be restricted by reducing the size of the rotation sensor 2*f*. Herein, rather than the rotation sensor 2*f* being disposed in one portion of the reinforcing member 5, the rotation sensor 2*f* may be formed in an annular form, and disposed over a whole periphery of the reinforcing member 5, as shown in FIG. 6. By disposing in this way, a load acting on the reinforcing member 5 disperses, whereby vibration can be restricted, and a further increase in accuracy can be achieved. The rotation sensor 2*f* of a form different again can also be disposed.

Although the present application is described above in terms of various exemplifying embodiments and implementations, it should be understood that the various features, aspects, and functionalities described in one or more of the individual embodiments are not limited in their applicability to the particular embodiment with which they are described, but instead can be applied, alone or in various combinations, to one or more of the embodiments.

It is therefore understood that numerous modifications that have not been exemplified can be devised without departing from the scope of the present application. For example, at least one constituent component may be modified, added, or eliminated. At least one of the constituent components mentioned in at least one of the preferred embodiments may be selected, and combined with the constituent components mentioned in another preferred embodiment.

What is claimed is:

1. A rotating electrical machine, comprising:
   a rotor held so as to be able to rotate;
   a rotational position detector that detects a rotational position of the rotor; and
   a stator that opposes the rotor and has a stator iron core in which a multiple of slots are formed,
   wherein the stator includes a coil wound around a toothed portion that forms the multiple of slots and an annular frame that holds an outer periphery of the stator iron core,
   a trunk portion and a flange portion are formed in the annular frame,
   a notch portion is provided in the trunk portion and the flange portion,
   the stator iron core is held by the trunk portion,
   a reinforcing member that straddles the notch portion is provided on the flange portion, and
   the rotational position detector is attached to the reinforcing member over the notch portion.

2. The rotating electrical machine according to claim 1, wherein the reinforcing member is provided in one portion of the flange portion.

3. The rotating electrical machine according to claim 1, wherein the reinforcing member is provided over a whole periphery of the flange portion.

4. The rotating electrical machine according to claim 1, wherein the rotational position detector has a signal line that extracts a signal of detection of the rotational position, and
   wherein the signal line is disposed in the notch portion.

5. The rotating electrical machine according to claim 4, wherein the rotational position detector is attached directly to the reinforcing member.

6. The rotating electrical machine according to claim 4, wherein the rotational position detector is attached to the reinforcing member via a holding member.

7. The rotating electrical machine according to claim 4, wherein the rotational position detector is attached to one portion of the reinforcing member.

8. The rotating electrical machine according to claim 4, wherein the rotational position detector is attached to a whole periphery of the reinforcing member.

9. The rotating electrical machine according to claim 1, wherein the reinforcing member is formed in an annular form or an arc form.

10. The rotating electrical machine according to claim 1, wherein the stator iron core is a split stator iron core.

11. The rotating electrical machine according to claim 1, wherein the reinforcing member is attached to the flange portion by a screw member.

12. The rotating electrical machine according to claim 1, wherein the notch portion is provided in the annular frame at an even pitch, or a pitch is an even pitch.

* * * * *